Figure 1:
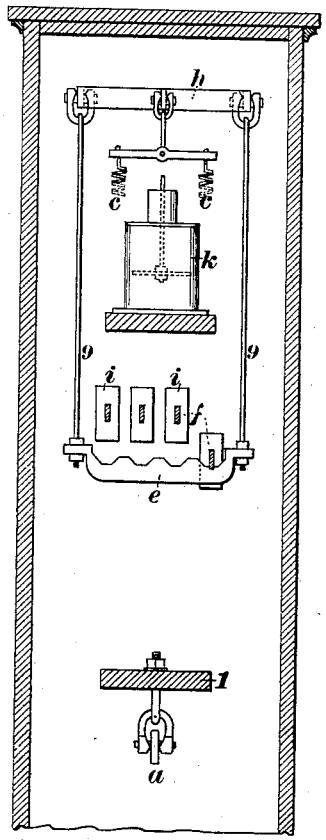

No. 762,200. PATENTED JUNE 7, 1904.
W. H. SARGENT.
WEIGHING SCALE.
APPLICATION FILED JAN. 7, 1904.
NO MODEL. 2 SHEETS—SHEET 1.

WITNESSES:
Albert Popkins
Laura V. Brereton

INVENTOR
Willis H. Sargent
BY
Sturtevant & Tracey
ATTORNEYS

No. 762,200.                                                      PATENTED JUNE 7, 1904.
W. H. SARGENT.
WEIGHING SCALE.
APPLICATION FILED JAN. 7, 1904.
NO MODEL.                                                           2 SHEETS—SHEET 2.
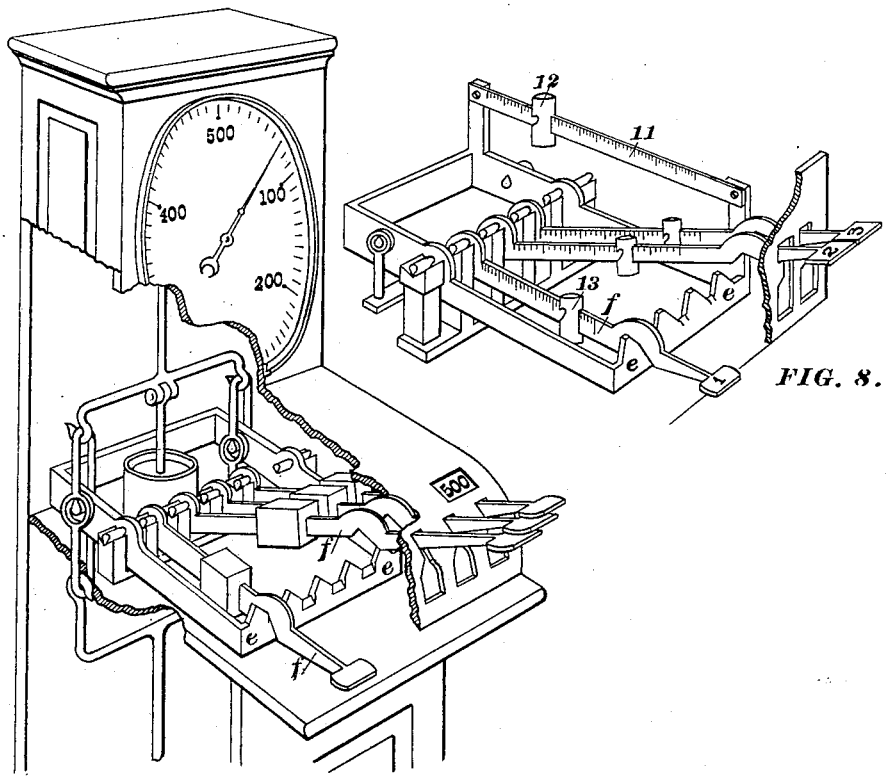
FIG. 8.
FIG. 7.
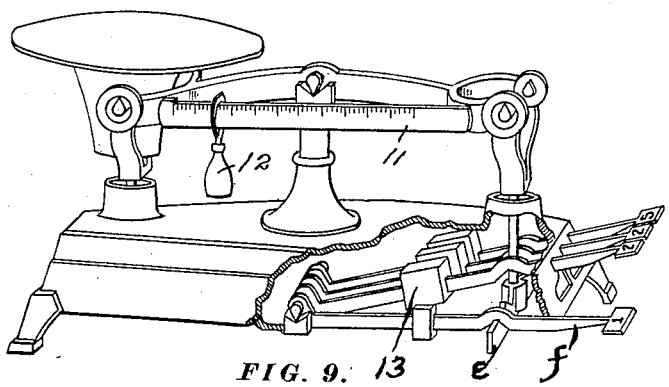
FIG. 9.
WITNESSES:
Albert Popkins
Laura V. Brereton
INVENTOR
Willis H. Sargent
BY
Shurtwood Neely
ATTORNEYS No. 762,200. Patented June 7, 1904.

UNITED STATES PATENT OFFICE.

WILLIS H. SARGENT, OF ST. JOHNSBURY, VERMONT, ASSIGNOR TO E. & T. FAIRBANKS & COMPANY, OF ST. JOHNSBURY, VERMONT, A CORPORATION OF VERMONT.

WEIGHING-SCALE.

SPECIFICATION forming part of Letters Patent No. 762,200, dated June 7, 1904.

Application filed January 7, 1904. Serial No. 188,110. (No model.)

*To all whom it may concern:*

Be it known that I, WILLIS H. SARGENT, a citizen of the United States, residing at St. Johnsbury, in the county of Caledonia, State of Vermont, have invented certain new and useful Improvements in Weighing-Scales, of which the following is a description, reference being had to the accompanying drawings and to the letters and figures of reference marked thereon.

The present invention relates to weighing-scales, and particularly to a weight-indicating device, the invention being intended for application to that class of platform-scales in which weights of certain known values need to be added to make up the entire capacity of the scales. Ordinarily this is provided for by the use of counterpoise-weights which are applied as necessary to a counterpoise-support attached to the end of the beam or are applied by selection of the operator as needed, these weights being ordinarily independent of the scale proper—that is, they are not permanently attached to the scale mechanism, but are separate, and therefore liable to be mislaid or lost.

The object of the present invention is to provide a series of weights which are, in effect, a part of the permanent mechanism of the scale and which may be applied more expeditiously than by placing them upon the scale by hand, as is usually done.

Further objects of the invention are to indicate to the sight what weights are in operation and their values and to prevent the application of such weights except in predetermined order.

The invention consists in the matters hereinafter described and referred to in the appended claims.

It will be understood that by the term "weighing-lever" as used throughout this specification I mean the lever which in the dial and spring construction of scale acts against the pressure of the springs and causes the position to indicate the weight or which in the graduated-beam construction of scale is the lever, which itself is graduated and provided with a sliding poise or which is operatively connected with the same to accomplish the desired results.

The invention is illustrated in the accompanying drawings, in which—

Figure 2:
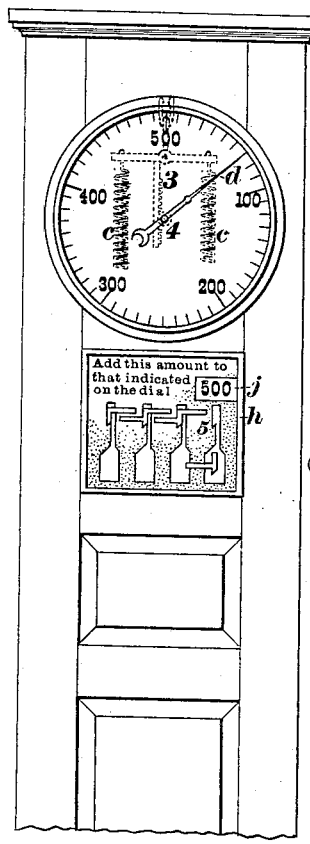
Figure 3:
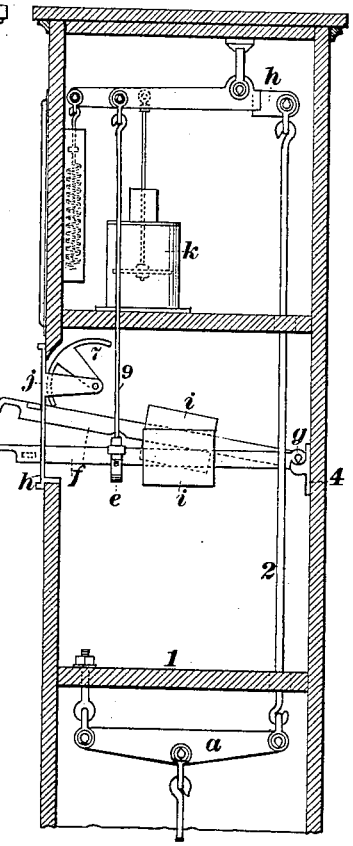
Figure 4:
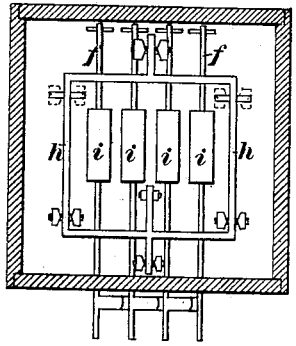
Figures 5, 6:
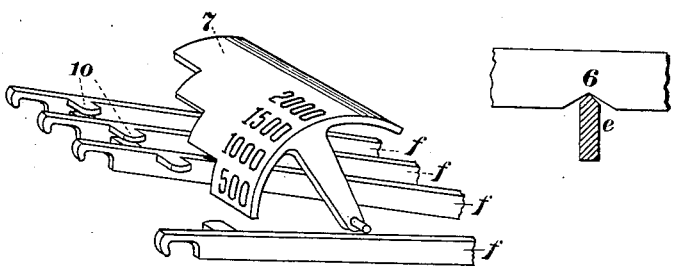

Figure 1 is a vertical section in front elevation of a portion of a dial and spring-scale embodying my invention, parts being removed. Fig. 2 is a front elevation of such a scale. Fig. 3 is a vertical transverse section of Fig. 2. Fig. 4 is a plan view of Fig. 3 with the top removed. Fig. 5 is a detail view showing the manner of supporting the indicating-signs. Fig. 6 is a detail view of the knife-edge bearing for the weighted levers. Fig. 7 is a sectional perspective view of a modified form of my invention, showing the weighted levers engaging directly with the weighing-lever, of which the rack is a part. Fig. 8 is a detail perspective view showing the application of my invention to a scale having a graduated beam and sliding poise; and Fig. 9 is a side view, partly in section, of a scale for counter use.

In the drawings, referring to the figures showing the dial and spring construction of scale, the platform and various other parts of usual construction are not deemed necessary of illustration.

The lever $a$, which is connected with the platform-levers (not shown) in the usual way, is attached at one end to the shelf 1, while its free end is hung from the rod 2, attached at its upper end to the short arm of the weighing-lever $h$, the long arm of which is arranged to pull upon the springs $c$ $c$ and through the rack and pinion 3 4 cause the hand $d$ on the pinion-shaft to revolve until it indicates the load upon the scale-platform. The dash-pot $k$, consisting of a plunger loosely playing in a cylinder filled with liquid, is provided for the purpose of absorbing vibration to allow the hand or pointer to settle quickly to the proper figure on the dial.

Suspended by rods 9, extending from opposite sides of the long arm of the weighing-lever, is a bar having notches which I have termed a "rack" e, the notches in the bar being for the purpose of receiving and holding a series of weighted levers or weight-latches f. These latches, as shown in Fig. 3, are pivoted at one end to the yoke 4 at g, the opposite end passing through a slot in the plate h under the dial. This slot is made with a notch 5, in which the weighted lever may rest when not in use; but when it is desired to apply the weight to the scale it is released from the notch and lowered until the V-shaped notch 6 in the latch engages the knife-edge of the rack e, as shown in Fig. 6, when the weight of the lever and its sliding weight i, set to draw in this case five hundred pounds, is transferred to the long arm of the lever, thus acting as a counterpoise-weight.

As shown in Fig. 5, a sign is provided consisting of a portion of the revoluble cylinder 7, having its lower edge formed into steps. One of the steps rests upon the first disengaged weighted lever. As one of these weighted levers is dropped into engagement a cylinder performs part of a revolution, disclosing a number through the opening j, as shown in Fig. 2, this number representing the value of the corresponding lever. When another weighted lever is thrown down, the first figures are covered up and other figures are disclosed through the same opening. These weighted levers or latches are preferably all alike in weight, although the markings are cumulative, being in this case "500, 1000, 1500, 2000." If one latch is thrown down, it will of course "draw" down five hundred pounds. If another is thrown into operation, it, with the other, will have "drawn" one thousand pounds. Hence the second latch sign is marked "1000," although by itself it only draws five hundred pounds, like the first. To avoid the possibility of the second latch being thrown into operation before the first, the latches or weighted levers are provided with interfering-pieces 10, broad enough so that each succeeding latch overlaps the previous one. This is shown clearly in Figs. 2 and 5 and effectually prevents any except the first disengaged latch or weighted lever being used.

In Fig. 7 is illustrated another form of my invention, in which the rack e instead of being suspended from the long arm of the weighing-lever, as in Fig. 3, is formed as a part of that weighing-lever and the weighted levers or weight-latches f engaged directly therewith.

Fig. 8 shows another form of my invention, in which the dial and spring construction are abolished and a graduated beam 11, with sliding poise 12, is attached to the weighing-lever, which in this case has the rack e formed with it. The weight-latches or weighted levers are in this arrangement also graduated and provided with sliding pieces 13, which may be set to any desired amount. The box may then be locked, if desired, and placed beyond the control of the weighman, who has only to throw down the proper latch and place enough load on the platform to balance the scale without knowing how much it weighs.

In Fig. 9 is shown a scale for counter use, which has beam 11 and a poise 12 thereon.

Various modifications and changes may be made without departing from the spirit of my invention.

Having thus described my invention, what I claim as new, and desire to secure by Letters Patent, is—

1. In a weighing-scale, in combination with the weighing-lever, a series of weighted levers with means for transferring their weight successively to the weighing-lever, a sign having thereon weight indications corresponding to each lever and operated successively by the levers; substantially as described.

2. In a weighing-scale, in combination with the weighing-lever, a series of weighted levers adapted to transfer their weight to the weighing-lever, and means on said weighted levers for preventing the movement of any succeeding one of said weighted levers until the preceding one has been operated; substantially as described.

3. In a weighing-scale, in combination with the weighing-lever, a series of weighted levers pivoted at one end upon a stationary part of the scale-frame, devices on the scale-frame for holding the same in inoperative position, said levers being adapted when disengaged from inoperative position to transfer their weight to the weighing-lever, said levers being provided with overlapping end pieces, whereby one cannot be operated until the preceding one has been; substantially as described.

4. In a weighing-scale, in combination with the weighing-lever, rods depending therefrom, a rack supported by said rods, and a series of successively-movable weighted levers pivoted to a common support on the scale-frame and adapted when operated to transfer their weight to the suspended rack; substantially as described.

5. In a weighing-scale in combination with the weighing-lever, a series of weighted levers adapted to transfer their weight to the weighing-lever, and a revoluble sign having a stepped lower edge adapted to successively engage said levers; substantially as described.

6. In a weighing-scale, in combination with the weighing-lever, a series of weighted levers adapted to transfer their weight to the weighing-lever, and a revoluble sign having a stepped lower edge adapted to successively engage said levers and having a series of weight indications thereon, said lever being provided with interfering-pieces 10, arranged so that said pieces 10 on one lever will overlap said piece on the previous weighted lever; substantially as described.

In testimony whereof I affix my signature in presence of two witnesses.

WILLIS H. SARGENT.

Witnesses:
FRANK O. FRENCH,
J. M. PERHAM.